(12) United States Patent
Kim et al.

(10) Patent No.: US 9,768,423 B2
(45) Date of Patent: Sep. 19, 2017

(54) BATTERY PACK

(71) Applicant: SAMSUNG SDI CO., LTD., Yongin-si, Gyeonggi-do (KR)

(72) Inventors: Jaemin Kim, Yongin-si (KR); Daeyon Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 27 days.

(21) Appl. No.: 14/741,349

(22) Filed: Jun. 16, 2015

(65) Prior Publication Data

US 2016/0087251 A1    Mar. 24, 2016

(30) Foreign Application Priority Data

Sep. 24, 2014   (KR) ........................ 10-2014-0127689

(51) Int. Cl.
*H01M 2/04* (2006.01)
*H01M 2/10* (2006.01)
(Continued)

(52) U.S. Cl.
CPC ....... *H01M 2/0404* (2013.01); *H01M 2/0469* (2013.01); *H01M 2/0473* (2013.01);
(Continued)

(58) Field of Classification Search
CPC ............. H01M 2/0404; H01M 2/0469; H01M 2/0473; H01M 2/10; H01M 2/1022;
(Continued)

(56) References Cited

U.S. PATENT DOCUMENTS

2005/0221175 A1   10/2005  Yoon
2009/0117412 A1    5/2009  Koh et al.
(Continued)

FOREIGN PATENT DOCUMENTS

DE   10 2010 026 093 A1   1/2012
DE   10 2012 223 562 A1   4/2014
(Continued)

OTHER PUBLICATIONS

EPO Search Report dated Jan. 29, 2016, for corresponding European Patent application 15186637.3, (5 pages).
(Continued)

*Primary Examiner* — Gregg Cantelmo
(74) *Attorney, Agent, or Firm* — Lewis Roca Rothgerber Christie LLP

(57) ABSTRACT

A battery pack includes a plurality of battery units. Each battery unit includes a can, an electrode assembly accommodated in the can and including a first electrode plate, a second electrode plate, and a separator between the first and second electrode plates, and a cap plate closing the can. The battery units are arranged side by side in a first direction. A protective circuit module is placed on the battery units and electrically connected to the battery units. An upper cover is placed on the protective circuit module; and a lower cover is positioned under the battery units and opposite the upper cover. The lower cover includes shock preventing portions protruding outward at both ends thereof.

13 Claims, 8 Drawing Sheets

IV

(51) Int. Cl.
   *H01M 2/34* (2006.01)
   *H01M 10/0525* (2010.01)

(52) U.S. Cl.
   CPC ............ *H01M 2/10* (2013.01); *H01M 2/1022* (2013.01); *H01M 2/1061* (2013.01); *H01M 2/34* (2013.01); *H01M 10/0525* (2013.01); *H01M 2220/30* (2013.01)

(58) Field of Classification Search
   CPC .. H01M 2/1061; H01M 2/34; H01M 10/0525; H01M 2220/30
   USPC .................. 429/7, 159, 96–100; 180/68.5
   See application file for complete search history.

(56) References Cited

U.S. PATENT DOCUMENTS

| | | | |
|---|---|---|---|
| 2009/0258285 A1* | 10/2009 | Kim | H01M 2/0404 429/97 |
| 2010/0143785 A1 | 6/2010 | Kwag et al. | |
| 2010/0209743 A1 | 8/2010 | Koh et al. | |
| 2010/0216015 A1 | 8/2010 | Kamada et al. | |
| 2011/0003195 A1 | 1/2011 | Kim | |
| 2013/0034763 A1 | 2/2013 | Byun | |

FOREIGN PATENT DOCUMENTS

| | | |
|---|---|---|
| EP | 2 408 041 A2 | 1/2012 |
| JP | 2008-166060 | 7/2008 |
| JP | 2008-192447 A | 8/2008 |
| JP | 2010-219035 A | 9/2010 |
| JP | 5087871 B2 | 12/2012 |
| JP | 5164469 B2 * | 3/2013 |
| KR | 10-2005-0096287 A | 10/2005 |
| KR | 10-2009-0047071 A | 5/2009 |
| KR | 10-2010-0064667 | 6/2010 |
| KR | 10-2010-0093737 A | 8/2010 |
| KR | 10-2014-0076856 A | 6/2014 |
| WO | WO 2012/003902 A2 | 1/2012 |

OTHER PUBLICATIONS

KIPO Office action dated Jan. 15, 2016, for Korean priority Patent application 10-2014-0127689, (6 pages).

English machine translation of Japanese Publication 2008-166060 dated Jul. 17, 2008, listed above, (21 pages).

Patent Abstracts of Japan and Machine English Translation for Japanese Publication No. 2008-027616 Corresponding to Japanese Patent No. 5087871 B2, Dec. 5, 2012, 21 Pages.

KIPO Notice of Allowance dated Jul. 26, 2016, for corresponding Korean Patent Application No. 10-2014-0127689 (2 pages).

* cited by examiner

BATTERY PACK

CROSS-REFERENCE TO RELATED APPLICATION

This application claims priority to and the benefit of Korean Patent Application No. 10-2014-0127689, filed on Sep. 24, 2014, in the Korean Intellectual Property Office, the entire content of which is incorporated herein by reference.

BACKGROUND

1. Field

One or more embodiments of the present invention relate to a battery pack.

2. Description of the Related Art

Development of wireless Internet and communication techniques has increased the demand for portable electronic devices that can be operated by batteries when a power outlet is not available. For example, portable computers that use a battery pack as a power source are small, easy to carry, and are widely employed for both business and personal use. The battery pack may include a plurality of rechargeable battery units to deliver sufficient output power.

SUMMARY

One or more embodiments of the present invention include a battery pack having improved durability and stability.

Additional aspects will be set forth in part in the description which follows and, in part, will be apparent from the description.

According to one or more exemplary embodiments, a battery pack includes: a plurality of battery units, each of the battery units including a can, an electrode assembly accommodated in the can and including a first electrode plate, a second electrode plate, and a separator between the first and second electrode plates, and a cap plate coupled to the can, the battery units being arranged next to each other in a first direction such that the cap plates of each of the battery units are facing the same direction; a protective circuit module on the battery units and electrically connected to the battery units; an upper cover on the protective circuit module; and a lower cover under the battery units and opposite the upper cover, the lower cover including shock preventing portions protruding outward at both ends thereof.

The lower cover may further include skirt portions extending in the first direction.

The lower cover may further include lateral wall portions extending at both ends thereof toward the battery units.

The lateral wall portions may have a first length extending in the second direction, the skirt portions may have a second length extending in the second direction, and the first length may be greater than the second length.

The shock preventing portions may be on respective lower ends of the lateral wall portions.

The shock preventing portions may be thicker than the lateral wall portions.

Each of the battery units may include: first and second long sides extending in the first and second directions, respectively, and short sides extending in the third direction perpendicular to the first and second directions; first and second long side surfaces opposite each other, each of the first and second long side surfaces abutting the first and second long sides; and first and second short side surfaces opposite each other, each of the first and second short side surfaces abutting the short sides and the second long sides.

The lateral wall portions may extend along the first and second short side surfaces, respectively.

The lateral wall portions may include: a first lateral wall portion extending along the first short side surface; and a second lateral wall portion extending along the second short side surface, wherein the first and second lateral wall portions may be opposite each other.

The first lateral wall portion may contact the first short side surface, and the second lateral wall portion may contact the second short side surface.

The battery units may be between the first and second lateral wall portions.

The lower cover may include long sides and short sides, wherein the shock preventing portions may be on the short sides of the lower cover, and the skirt portions may be on the long sides of the lower cover.

The lower cover may further include stopping jaws on the long sides, the stopping jaws extending from the skirt portions and having a height less than a height of the skirt portions.

The lower cover may include an upper surface on which the battery units are placed, and the upper surface of the lower cover may extend to outermost edges of the short sides of the lower cover to be opened at the short sides.

Inner side portions of the lower cover where the upper surface, the skirt portions, and the stopping jaws are connected may be rounded.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
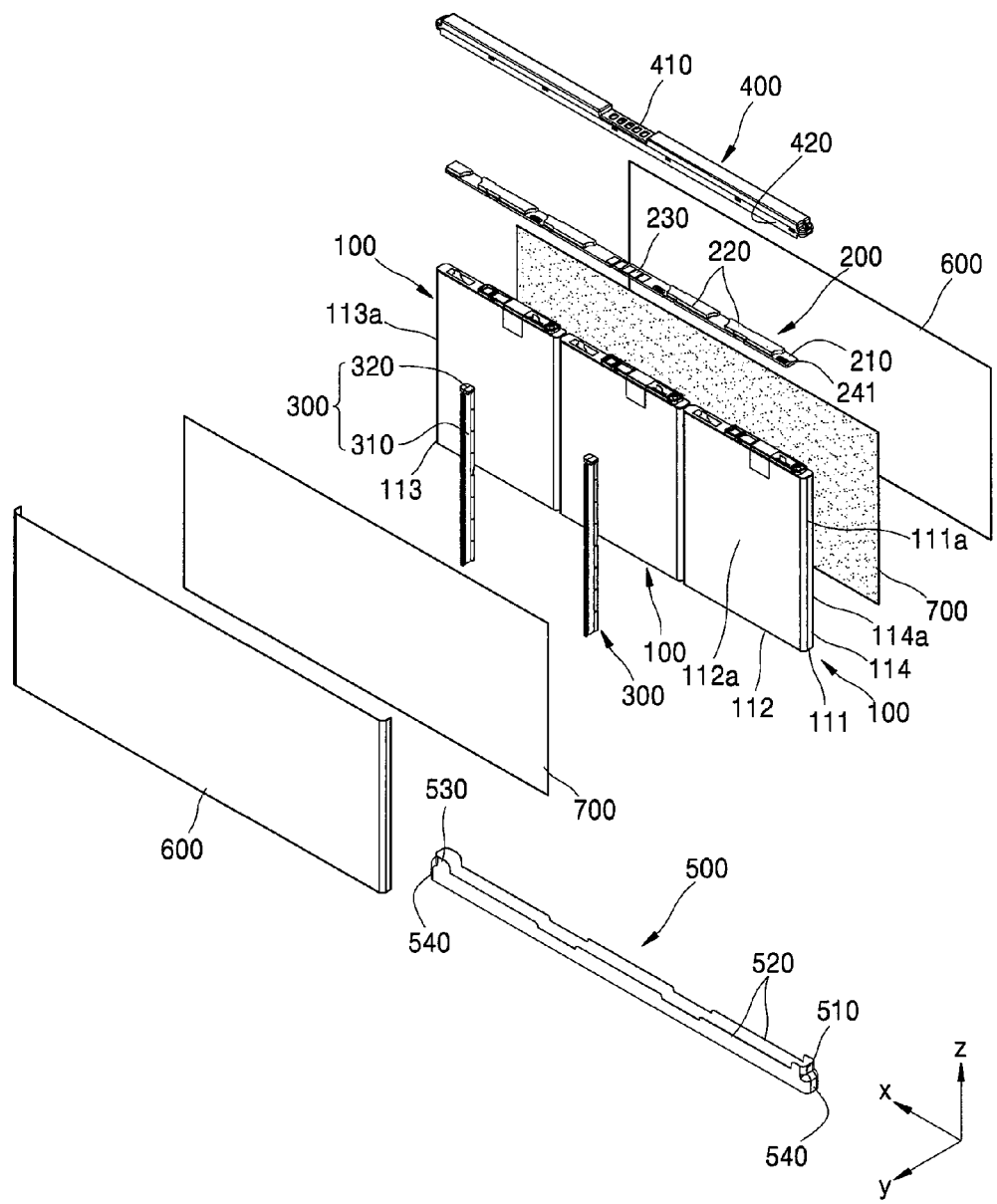
FIG. 1 illustrates an exploded schematic perspective view of a battery pack according to one embodiment.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. As those skilled in the art would recognize, the exemplary embodiments may have different forms and should not be construed as being limited to the descriptions set forth herein. As used herein, the term "and/or" includes any and all combinations of one or more of the associated listed items. Further, the use of "may" when describing embodiments of the present invention refers to "one or more embodiments of the present invention."

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

In the following description of embodiments of the present invention, the terms of a singular form may include plural forms unless the context clearly indicates otherwise.

It will be further understood that the terms "include," "comprise," "including," or "comprising" specify a property, a region, a fixed number, a step, a process, an element, a component, and a combination thereof but do not exclude other properties, regions, fixed numbers, steps, processes, elements, components, and combinations thereof.

It will also be understood that when a film, a region, or an element is referred to as being "above" or "on" another film, region, or element, it can be directly on the other film, region, or element, or intervening films, regions, or elements may also be present.

Herein, the x-axis, the y-axis and the z-axis are not limited to the three axes of the rectangular coordinate system, and may be interpreted in a broader sense. For example, the x-axis, the y-axis, and the z-axis may be perpendicular to one another, or may represent different directions that are not perpendicular to one another.

In the drawings, the sizes of elements may be exaggerated for clarity. For example, in the drawings, the size or thickness of each element may be arbitrarily shown for illustrative purposes, and thus the embodiments of the present invention should not be construed as being limited thereto.

Figure 2:
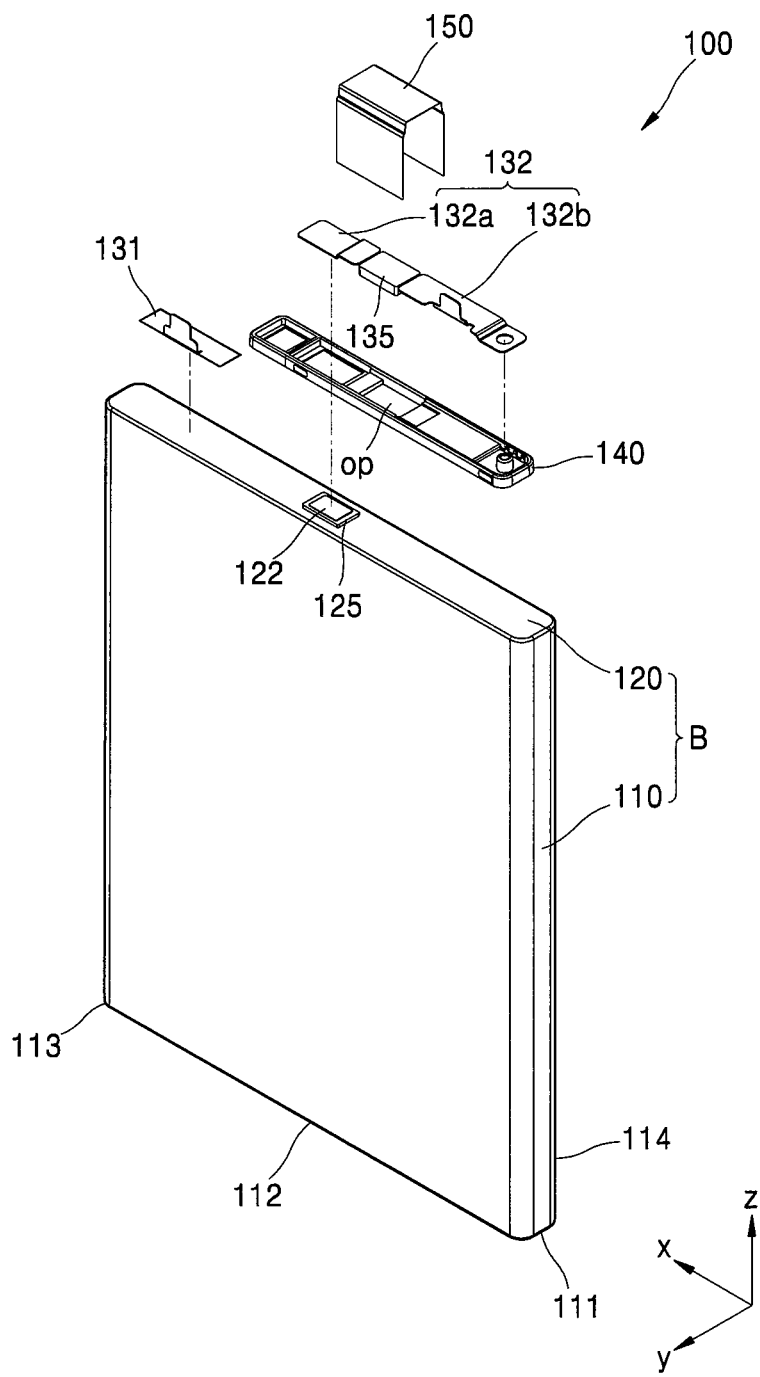
FIG. 2 illustrates an exploded schematic perspective view of a battery unit illustrated in FIG. 1.
Figure 3:
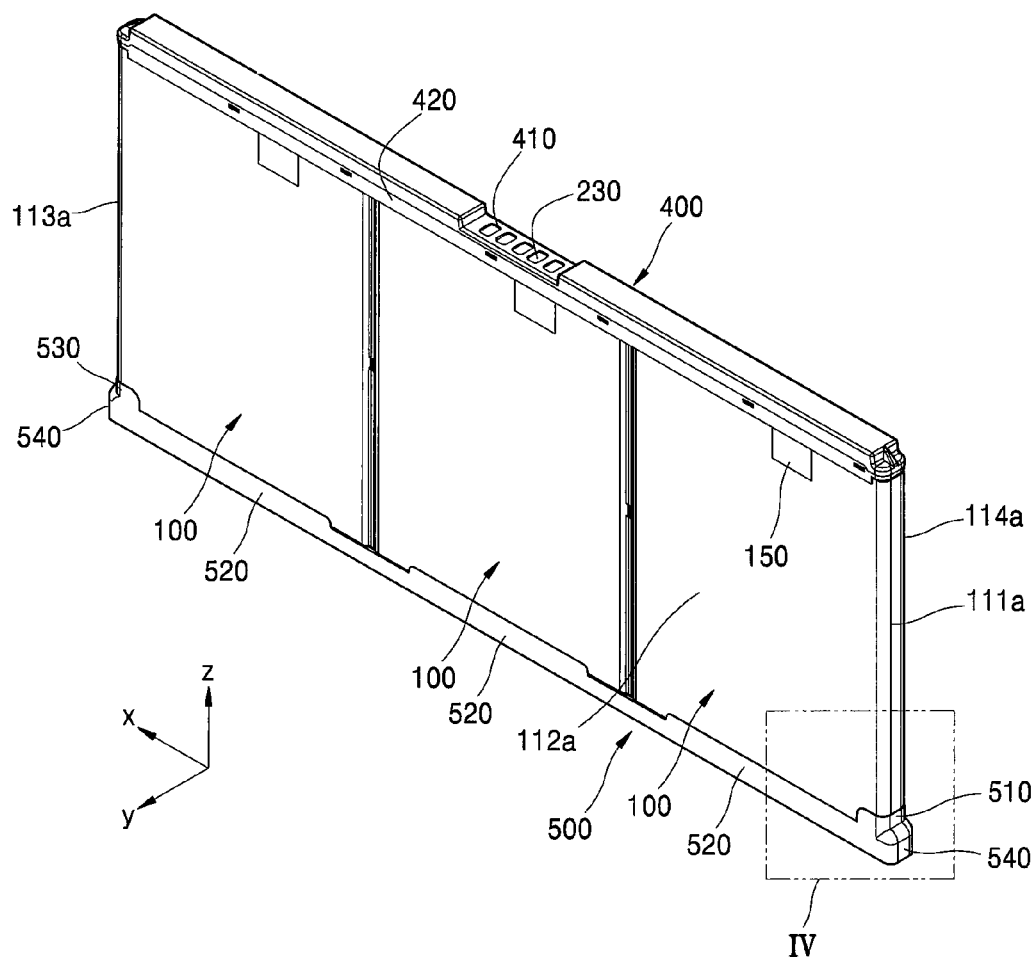
FIG. 3 illustrates a perspective schematic view of the battery units, a protective circuit module, an upper cover, and a lower cover illustrated in FIG. 1 in an assembled state.
Figure 4:
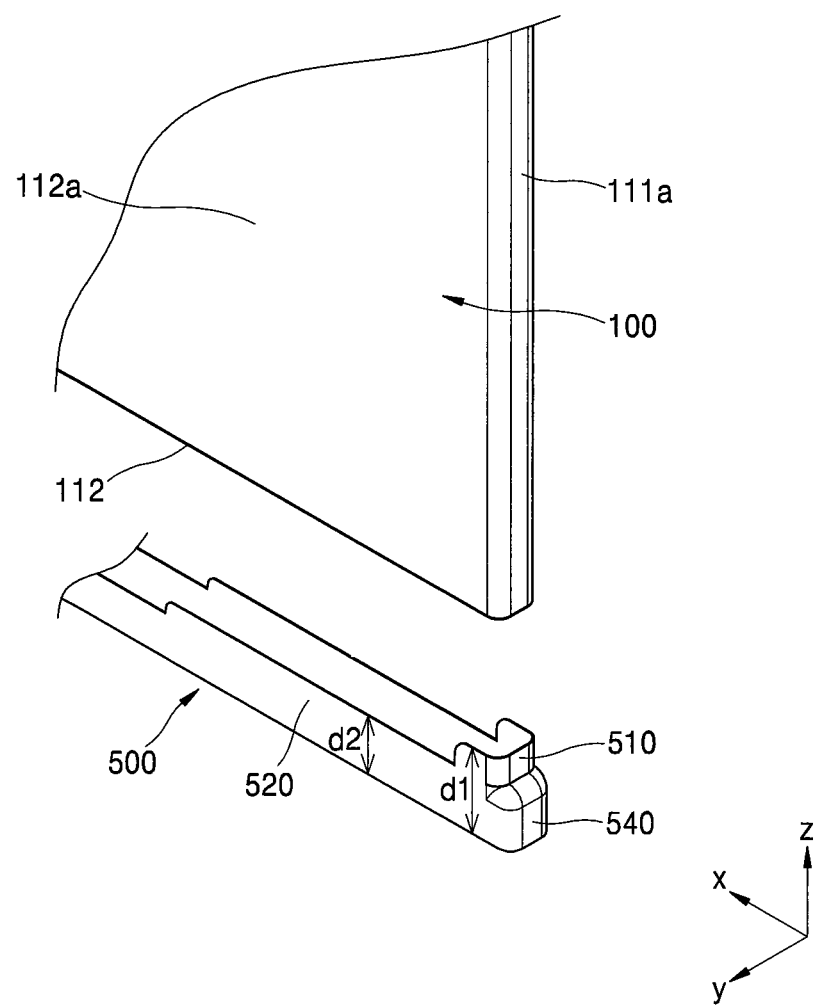
FIG. 4 illustrates an exploded schematic perspective view of portion IV of FIG. 3.

FIG. 1 is a schematic perspective view illustrating a battery pack according to one embodiment, and FIG. 2 is a schematic perspective view illustrating a battery unit 100 and a holder 140 illustrated in FIG. 1. FIG. 3 is a schematic perspective view illustrating battery units 100, a protective circuit module 200, an upper cover 400, and a lower cover 500 illustrated in FIG. 1 in an assembled state, and FIG. 4 is an exploded schematic perspective view illustrating portion IV of FIG. 3. In FIG. 3, labels 600 and insulation films 700 are not shown for clarity of illustration.

Referring to FIGS. 1 to 4, the battery pack may include battery units 100, protective circuit module 200 electrically connected to the battery units 100, spacers 300 electrically insulating the battery units 100 from each other, upper cover 400, lower cover 500, labels 600, and insulation films 700.

The battery units 100 may be arranged side by side (or next to each other) in a first direction (for example, x-axis direction). For example, the battery units 100 may be arranged side by side with upper (or top) surfaces of the battery units 100 facing the same direction (for example, z-axis direction), and lateral surfaces of the battery units 100 facing the respective lateral surfaces of the neighboring battery units 100. The battery units 100 may be rechargeable lithium-ion battery units.

The battery units 100 may each include long sides 112 and 114 and short sides 111 and 113. The long sides 112 and 114 may be perpendicular or substantially perpendicular to each other, and a first long side surface 112a and a second long side surface 114a may be positioned to face each other such that each of the first and second long side surfaces 112a and 114a abuts the long sides 112 and 114. The short sides 111 and 113 may be parallel or substantially parallel to each other, and a first short side surface 111a and a second short side surface 113a may be positioned to face each other such that each of the first and second short side surfaces 111a and 113a abuts the short sides 111 and 113, respectively, and the long sides 114.

Referring to FIG. 2, each of the battery units 100 may include a bare cell B and a holder 140 coupled to an upper (or top) surface of the bare cell B.

The bare cell B may include a can 110 having an opening, an electrode assembly inserted into the can 110 through the opening, a cap plate 120 closing the opening of the can 110, and an electrode pin 122 on the cap plate 120.

The can 110 may have a hexahedral shape with an opening on one side, and may be formed of a metallic material capable of providing a certain degree of strength to the can. For example, the can 110 may be formed of aluminum or an aluminum alloy. After the electrode assembly is inserted into the can 110 through the opening on the side of the can 110, the opening of the can 110 may be hermetically closed (or sealed) by the cap plate 120. The cap plate 120 may be formed of a metallic material such as, for example, aluminum or an aluminum alloy. Portions of the cap plate 120 and the can 110 in contact with each other may be welded together using a laser, thus sealing the inside of the can 110.

The electrode assembly may include first and second electrode plates coated with respective electrode active materials and a separator between the first and second electrode plates. The first and second electrode plates may have different polarities. The electrode assembly may be formed by sequentially stacking the first electrode plate, the separator, and the second electrode plate, and winding them in a jelly roll shape.

Although the electrode assembly has been described herein as having a jelly roll shape, the shape of the electrode assembly is not limited thereto. For example, a first electrode plate, a separator, and a second electrode plate may be sequentially stacked to form a stack that may be used as an electrode assembly.

In one embodiment, the electrode pin 122 is formed on the cap plate 120. The first electrode plate may be electrically connected to the cap plate 120, and the second electrode plate may be electrically connected to the electrode pin 122. Since the first and second electrode plates have different polarities, the electrode pin 122 and the cap plate 120 may have different polarities. For example, the electrode pin 122 may have a negative polarity, and the cap plate 120 may have a positive polarity. In addition, a gasket 125 may be placed between the electrode pin 122 and the cap plate 120 to insulate the electrode pin 122 from the cap plate 120 and prevent or reduce the risk of a short circuit between the electrode pin 122 and the cap plate 120. Accordingly, the gasket 125 may be formed from an insulation material.

Each of the battery units 100 may include a first electrode tab 131 and a second electrode tab 132. The first and second electrode tabs 131 and 132 may respectively function as a positive terminal and a negative terminal of the secondary battery.

In one embodiment, the first electrode tab 131 may be positioned on the cap plate 120 and may be electrically connected to the cap plate 120. In one embodiment, the first electrode tab 131 may be welded on the cap plate 120.

Accordingly, if the cap plate 120 has a positive polarity, the first electrode tab 131 on the cap plate 120 may have a positive polarity.

The second electrode tab 132 may be connected (or coupled) to the electrode pin 122 and a temperature device 135 such as a temperature cutoff (TCO) device. The second electrode tab 132 may include a first part 132a and a second part 132b. An end portion of the first part 132a may be connected to the electrode pin 122, and the other end portion of the first part 132a may be connected to the temperature device 135. In addition, an end portion of the second part 132b may also be connected to the temperature device 135. Accordingly, the second electrode tab 132 may be simultaneously electrically connected to both the temperature device 135 and the electrode pin 122.

In one embodiment, the first and second electrode tabs 131 and 132 are positioned on the cap plate 120. In embodiments where the cap plate 120 has a positive polarity as described above, the second electrode tab 132 may have a negative polarity, and thus may be short-circuited with the cap plate 120. To prevent or reduce the risk of such short circuit, a holder 140 may be placed between the second electrode tab 132 and the cap plate 120.

The holder 140 may accommodate the second electrode tab 132 and the temperature device 135. For example, the holder 140 may include an opening OP at a position corresponding to the position of the temperature device so that the temperature device may be close enough to the battery unit 100 so as to measure the temperature of the battery unit 100.

The holder 140 in which the second electrode tab 132 and the temperature device 135 are accommodated may be fixed to the battery unit 100 by a fixing material such as, for example, a tape 150.

Referring back to FIGS. 1 to 3, the protective circuit module 200 may be positioned on the upper (or top) surfaces of the battery units 100, for example, on the cap plates 120 of the battery units 100, and may be electrically connected to the battery units 100 so as to control the charging and discharging features of the battery units 100. The protective circuit module 200 may prevent or reduce the risk of overheating and explosions that may be caused by overcharging, overdischarging, or an overcurrent of the battery units 100.

The protective circuit module 200 may include a circuit board 210, protection devices 220 on the circuit board 210, and external terminals 230. The circuit board 210 may extend in the direction in which the battery units 100 are arranged next to each other (for example, in the x-axis direction). The protection devices 220 may include safety devices or integrated circuits including passive elements such as resistors and condensers or active elements such as transistors.

The circuit board 210 may further include connection holes 241. The first and second electrode tabs 131 and 132 of each of the battery units 100 may be inserted into the connection holes 241 of the circuit board 210 and may be soldered to the circuit board 210. In one embodiment, the circuit board 210 includes a pattern for connecting the battery units 100 in series and/or in parallel. Specifically, since the first and second electrode tabs 131 and 132 of each of the battery units 100 are directly connected to the circuit board 210 through the connection holes 241, charging and discharging of the battery units 100 may be controlled by operations of the protection devices 220, and the battery units 100 may be connected in series and/or in parallel.

The spacers 300 may be positioned between each pair of the neighboring battery units 100, and upper (or top) ends of the spacers 300 may extend toward the protective circuit module 200 and may support the protective circuit module 200. For example, the spacers 300 may each include a first part 310 positioned between the neighboring battery units 100, and a second part 320 extending from the first part 310 toward the protective circuit module 200.

The first parts 310 of the spacers 300 may electrically insulate the battery units 100 from each other. As described with reference to FIG. 2, the can 110 and the cap plate 120 of each of the battery units 100 may be formed of metallic materials and may be welded together. Thus, the can 110 and the cap plate 120 may have the same polarity. Accordingly, when the battery units 100 are arranged side by side next to each other as shown in FIG. 1, unnecessary (or undesired) electric connections may occur between the neighboring battery units 100. However, when the first parts 310 of the spacers 300 are positioned between each pair of the neighboring battery units 100, as described in embodiments of the present invention, the occurrence of unnecessary (or undesired) connections between the battery units 100 may be prevented or reduced.

The second parts 320 of the spacers 300 may each be accommodated in a space (or gap) between the protective circuit module 200 and the respective battery unit 100 and may support the protective circuit module 200. Since the cap plates 120 of each of the battery units 100 include the electrode pins 122 protruding upward, and the holders 140 on the cap plates 120, a space may be formed between the upper (or top) surfaces of the battery units 100 and a lower (or bottom) surface of the protective circuit module 200. Accordingly, the second parts 320 of the spacers 300 may be accommodated in the spaces between the lower (or bottom) surface of the protective circuit module 200 and the upper (or top) surfaces of the respective battery units 100 and may support the protective circuit module 200 and protect the protective circuit module 200 from a force applied thereto.

The upper cover 400 may be placed on the protective circuit module 200. The upper cover 400 may include openings 410 through which the external terminals 230 of the protective circuit module 200 may be exposed.

The upper cover 400 may have substantially the same length as the total length of the battery units 100 arranged side by side in the first direction (for example, x-axis direction). The upper cover 400 may be coupled to the battery units 100, with the protective circuit module 200 positioned therebetween.

The lower cover 500 may be placed opposite the upper cover 400 and may face the upper cover 400. In one embodiment, the upper cover 400 covers the upper (or top) surfaces of the battery units 100, with the protective circuit module 200 positioned therebetween, and the lower cover 500 covers lower (or bottom) surfaces of the battery units 100. The lower cover 500 may have substantially the same length as the total length of the battery units 100 arranged side by side in the first direction (for example, x-axis direction).

Referring to FIGS. 3 and 4, the lower cover 500 may include first and second lateral wall portions 510 and 530 positioned at opposite ends of the lower cover 500, respectively, and shock preventing portions 540 positioned on either end of the lower cover 500. The first and second lateral wall portions 510 and 530 may each extend in a direction toward the battery units 100 (for example, upward in the +z-axis direction). The lower cover 500 may further include skirt portions 520 respectively extending from the first and second lateral wall portions 510 and 530 along the first direction (for example, x-axis direction). The first and second lateral wall portions 510 and 530 may each have a first length d1 extending in the direction toward the battery units 100 (for example, upward in the +z-axis direction), and the skirt portions 520 may have a second length d2 extending in the direction toward the battery units 100 (for example, upward in the +z-axis direction). In one embodiment, the first length d1 may be greater than the second length d2. In other words, in the lower cover 500, the first and second lateral wall portions 510 and 530 may each be longer than the skirt portions 520 in the direction toward the battery units 100 (for example, the +z-axis direction). As a result, the battery units 100 may be more securely fixed to the lower cover 500.

The first and second lateral wall portions 510 and 530 may extend along the first short side surface 111a and the second short side surface 113a of the battery units 100, respectively. The first and second lateral wall portions 510 and 530 may be opposite each other. The battery units 100 may be between the first and second lateral wall portions 510 and 530, such that the first lateral wall portion 510 may be in tight contact with the first short side surface 111a, and the second lateral wall portion 530 may be in tight contact with the second short side surface 113a.

The shock preventing portions 540 may be positioned on both ends of the lower cover 500 and may protrude outward from the lower ends of the first and second lateral wall portions 510 and 530. For example, the shock preventing portions 540 may protrude outward in the first direction (for example, the x-axis direction). The shock preventing portions 540 may be thicker than the rest of the lower cover 500. For example, the shock preventing portions 540 may be thicker than each of the first and second lateral wall portions 510 and 530.

The shock preventing portions 540 may be positioned at each of the short sides 111 and 113. Referring to FIG. 4, one shock preventing portion 540 may extend from the lower end of the lateral wall portion 510 and may protrude away from the first short side surface 111a (for example, in a negative x-direction). Similarly, another shock preventing portion 540 may extend from the lower end of the lateral wall portion 530 and may protrude away from the second short side surface 113a (for example, in a positive x-direction).

The labels 600 may be attached to and may cover the side surfaces of the battery units 100. The insulation films 700 may be placed between the labels 600 and the side surfaces of the battery units 100. For example, the insulation films 700 may be placed between the labels 600 and at least one of the first long side surface 112a and the second long side surface 114a of the battery units 100.

Portions of the labels 600 may be attached to the upper cover 400 and the lower cover 500. Specifically, portions of the labels 600 may be attached to the skirt portions 420 and 520 of the upper cover 400 and the lower cover 500, respectively, that extend toward the battery units 100. Accordingly, the battery units 100 may be insulated by the upper cover 400, the lower cover 500, and the labels 600 and may not be exposed.

Due to the lateral wall portions 510 and 530 of the lower cover 500 respectively extending along the first and second short side surfaces 111a and 113a of the battery units 100, the battery units 100 arranged side by side in the first direction (for example, x-axis direction) may be more easily fixed to the lower cover 500. In addition, the battery units 100 may be protected or substantially protected from the impact (for example, if the battery is dropped) by the shock preventing portions 540 positioned at the lower corners of the battery units 100. Accordingly, a strong structure for protecting the battery units 100 may be formed.

Figure 5:
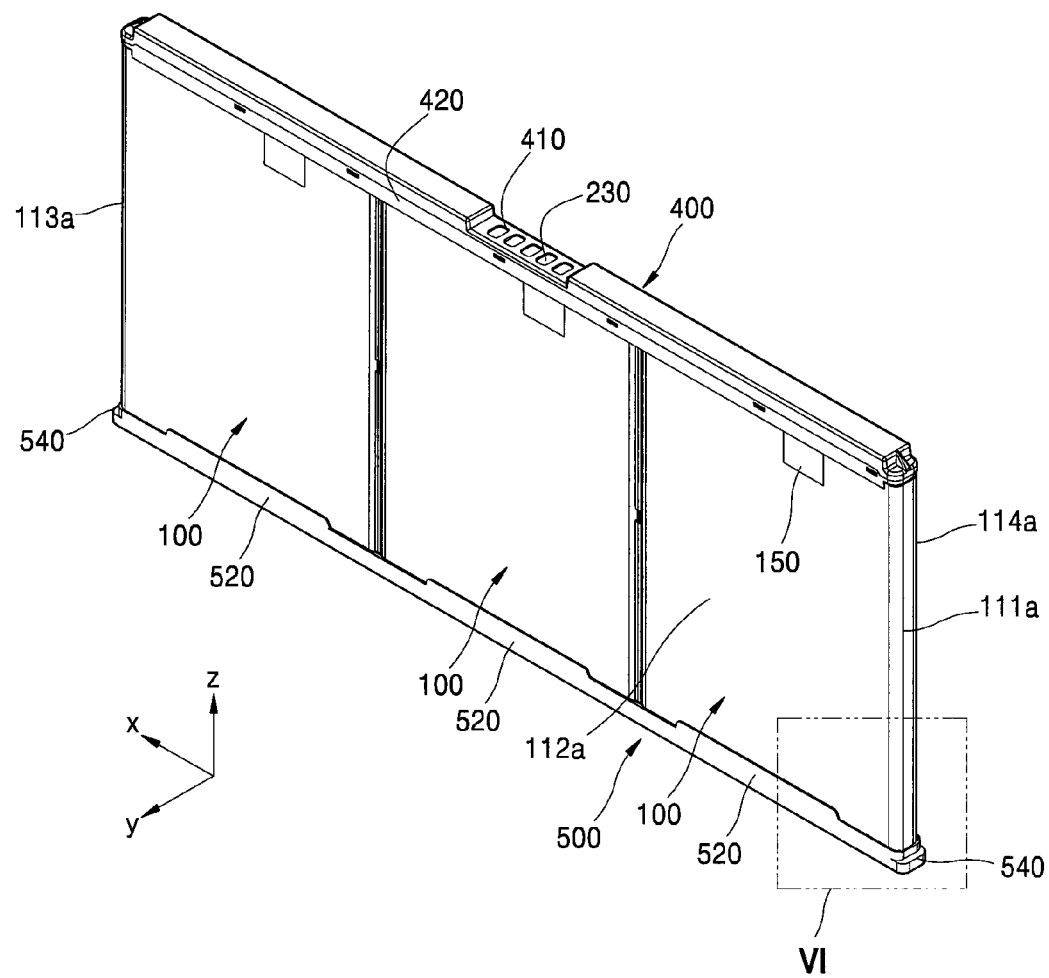
FIG. 5 illustrates a perspective view of a battery pack according to another embodiment of the present invention.
Figure 6:
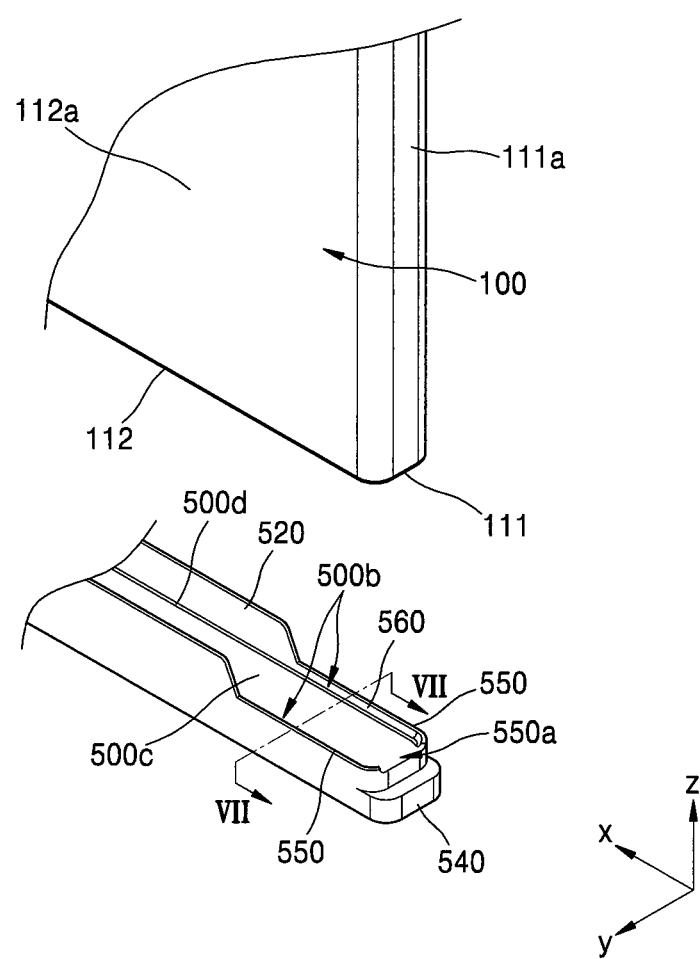
FIG. 6 illustrates an exploded perspective of portion VI of FIG. 5.
Figure 7:
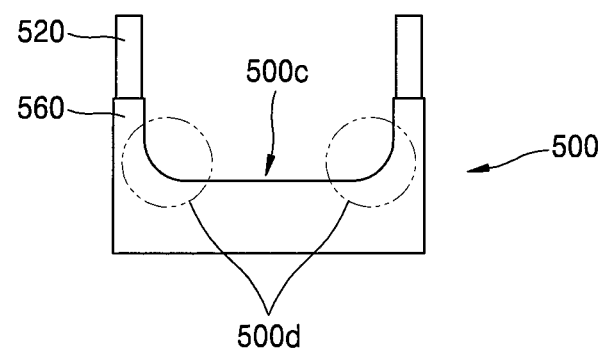
FIG. 7 illustrates a view of a lower cover illustrated in FIG. 5.
Figure 8:
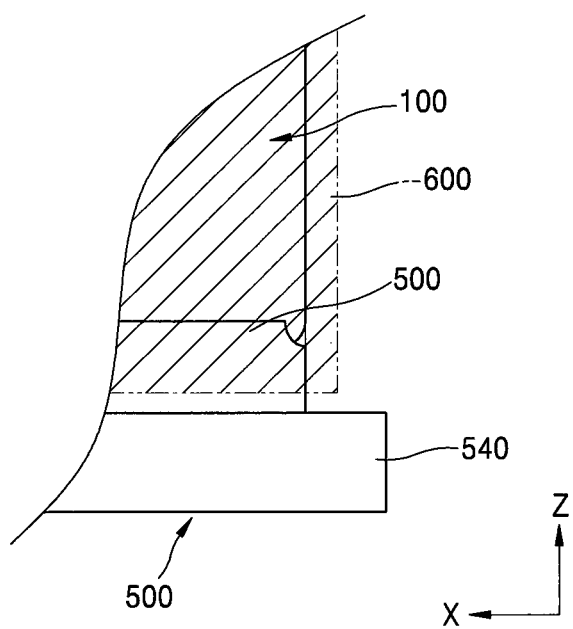
FIG. 8 illustrates a side view of a portion of the battery pack illustrated in FIG. 5.

FIG. 5 illustrates a perspective view of a battery pack according to another embodiment of the present invention, FIG. 6 illustrates an exploded perspective view of portion VI of FIG. 5, FIG. 7 illustrates a view of a lower cover 500 illustrated in FIG. 5, and FIG. 8 illustrates a side view of a portion of the battery pack illustrated in FIG. 5.

Referring to FIGS. 5 to 8, the battery pack includes a plurality of battery units 100, a protective circuit module 200 electrically connected to the battery units 100, spacers 300 electrically insulating the battery units 100 from each other, an upper cover 400, and the lower cover 500. In the current exemplary embodiment, the lower cover 500 may include skirt portions 520, shock preventing portions 540, stopping jaws 560, and openings 550a. The battery pack of the current exemplary embodiment has the same structure as the battery pack illustrated in FIGS. 1 to 4 except for the lower cover 500, and thus, descriptions of the same elements will not be repeated.

The lower cover 500 may include the skirt portions 520, the shock preventing portions 540, and the stopping jaws 560 extending from the skirt portions 520. The lower cover 500 includes a pair of short sides 500a facing each other, a pair of long sides 500b facing each other, and an upper surface 500c on which the battery units 100 are disposed. The short sides 500a of the lower cover 500 may correspond to short sides 111 and 113 of the battery units 100, and the long sides 500b of the lower cover 500 may correspond to long sides 112 and 114 of the battery units 100.

Inner side portions 500d of the lower cover 500 where the upper surface 500c, the skirt portions 520, and the stopping jaws 560 are connected may be rounded so that the battery units 100 may be more easily fixed to the lower cover 500.

The shock preventing portions 540 may be formed at positions corresponding to the short sides 500a of the lower cover 500. The shock preventing portions 540 may protrude outward and have a height different from that of the upper surface 500c of the lower cover 500. The shock preventing portions 540 may protrude in a first direction (for example, an x-axis direction) along which the battery units 100 are arranged side by side. The shock preventing portions 540 may be formed to be thicker than other portions of the lower cover 500 for protecting the battery pack from impact forces applied to the short sides 500a of the lower cover 500.

The skirt portions 520 may be on the long sides 500b of the lower cover 500. The skirt portions 520 may be provided for the battery units 100, respectively, and may extend along the battery units 100 (in the x-axis direction) to function as supports fixing the battery units 100 to the lower cover 500. The stopping jaws 560 may extend from the skirt portions 520 and may be positioned between the skirt portions 520. The stopping jaws 560 may be lower than the skirt portions 520 and may support the battery units 100 at positions where the skirt portions 520 are not formed. The stopping jaws 560 may be formed on the long sides 500b and extend toward the short sides 500a. In this case, the stopping jaws 560 may not be formed on the short sides 500a and thus may be opened at the short sides 500a. That is, the upper surface 500c may extend to outermost edges of the short sides 500a of the lower cover 500, and thus the short sides 500a may have an opened shape.

Referring to FIG. 7, in the current exemplary embodiment, the inner side portions 500d of the lower cover 500 where the upper surface 500c, the skirt portions 520, and the stopping jaws 560 are connected may be rounded. Therefore, the lower cover 500 may more tightly make contact with the battery units 100, and the battery units 100 may be more securely fixed to the lower cover 500. However, the shape of the inner side portions 500d is not limited thereto. For example, the shape of the inner side portions 500d may vary according to the shape of the battery units 100.

Referring to FIG. 8, since the short sides 500a of the lower cover 500 are opened, battery units 100 and the lower cover 500 may be coupled together without (or substantially without) forming any stepped portions therebetween, that may otherwise be formed if the stopping jaws 560 were positioned on the short sides 500a of the lower cover 500. Therefore, when a label 600 is wrapped around the lower cover 500 and the battery units 100, the label 600 may not tear or no empty space may be formed below the label 600.

According to one or more embodiments of the present invention, the battery pack may have improved durability and stability.

However, embodiments of the present invention are not limited thereto. Other effects, features, and advantages of the battery pack of the present embodiments may be understood by those skilled in the art from the above description with reference to the accompanying drawings.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While certain exemplary embodiments have been described with reference to the figures, it will be understood by those of ordinary skill in the art that various changes in form and details may be made therein without departing from the spirit and scope of the present disclosure as defined by the following claims and equivalents thereof.

What is claimed is:

1. A battery pack comprising:
   a plurality of battery units, each of the battery units comprising a can, an electrode assembly accommodated in the can having opposing planar surfaces and opposing lateral surfaces between the planar surfaces and a cap plate coupled to the can, the battery units being arranged next to each other in a first direction such that the cap plates of each of the battery units are facing the same direction and such that the planar surfaces are coplanar;
   a protective circuit module on the battery units and electrically connected to the battery units;
   an upper cover on the protective circuit module; and
   a lower cover under the battery units and opposite the upper cover, the lower cover comprising lateral wall portions extending from both ends thereof in a second direction towards the upper cover and perpendicular to the first direction and shock preventing portions protruding outwardly in the first direction such that a thickness of the shock preventing portions in the first direction is greater than a thickness of the lateral walls in the first direction.

2. The battery pack of claim 1, wherein the lower cover further comprises skirt portions extending in the first direction.

3. The battery pack of claim 1, wherein the lateral wall portions have a first length extending in the second direction, and the skirt portions have a second length extending in the second direction, and
   wherein the first length is greater than the second length.

4. The battery pack of claim 1, wherein the shock preventing portions are on respective lower ends of the lateral wall portions.

5. The battery pack of claim 1, wherein each of the battery units comprises:
   first and second long sides extending in the first and second directions, respectively, and short sides extending in the third direction perpendicular to the first and second directions;
   first and second long side surfaces opposite each other, each of the first and second long side surfaces abutting the first and second long sides; and
   first and second short side surfaces opposite each other, each of the first and second short side surfaces abutting the short sides and the second long sides.

6. The battery pack of claim 5, wherein the lateral wall portions extend along the first and second short side surfaces.

7. The battery pack of claim 5, wherein the lateral wall portions comprise:
   a first lateral wall portion extending along the first short side surface; and
   a second lateral wall portion extending along the second short side surface,
   wherein the first and second lateral wall portions are opposite each other.

8. The battery pack of claim 7, wherein the first lateral wall portion contacts the first short side surface, the second lateral wall portion contacts the second short side surface, and
   wherein the battery units are between the first and second lateral wall portions.

9. The battery pack of claim 5, wherein the shock preventing portions extend from the short sides.

10. The battery pack of claim 2, wherein the lower cover further comprises long sides and short sides,
    wherein the shock preventing portions are on the short sides of the lower cover, and the skirt portions are on the long sides of the lower cover.

11. A battery pack comprising:
    a plurality of battery units, each of the battery units comprising a can, an electrode assembly accommodated in the can and comprising a first electrode plate, a second electrode plate, and a separator between the first and second electrode plates, and a cap plate coupled to the can, the battery units being arranged next to each other in a first direction such that the cap plates of each of the battery units are facing the same direction;
    a protective circuit module on the battery units and electrically connected to the battery units;
    an upper cover on the protective circuit module; and
    a lower cover under the battery units and opposite the upper cover, the lower cover comprising:
    long sides and short sides,
    shock preventing portions respectively protruding from the short sides in the first direction,
    skirt portions respectively on the long sides and extending in the first direction, and
    stopping jaws on the long sides and respectively extending from the skirt portions, the stopping jaws having a height less than a height of the skirt portions.

12. The battery pack of claim 11, wherein the lower cover further comprises an upper surface on which the battery units are placed, the upper surface extending to outermost edges of the short sides of the lower cover to be opened at the short sides.

13. The battery pack of claim 11, wherein the lower cover further comprises inner side portions where the upper surface, the skirt portions, and the stopping jaws are connected, wherein the inner side portions are rounded.

* * * * *